United States Patent [19]

Ebert

[11] Patent Number: 5,884,235
[45] Date of Patent: Mar. 16, 1999

[54] NON-CONTACT, ZERO-FLUX TEMPERATURE SENSOR

[75] Inventor: Jon L. Ebert, Morgan Hill, Calif.

[73] Assignee: Integrated Systems, Inc., Sunnyvale, Calif.

[21] Appl. No.: 768,915

[22] Filed: Dec. 17, 1996

[51] Int. Cl.$^6$ .............................. G01J 5/12; G01K 13/00
[52] U.S. Cl. .............................. 702/87; 702/99; 702/130; 374/164; 374/179
[58] Field of Search .............................. 364/557, 559, 364/560, 561, 579, 475.1, 477.01; 374/120, 121, 124, 131, 133, 164, 166, 179; 702/87, 99, 130–134, 121

[56] References Cited

U.S. PATENT DOCUMENTS

| | | | |
|---|---|---|---|
| 4,887,229 | 12/1989 | Weiss | 702/131 |
| 4,955,727 | 9/1990 | Weiss | 702/134 |
| 5,054,936 | 10/1991 | Fraden | 374/164 |
| 5,106,200 | 4/1992 | Hosokawa | 374/121 |
| 5,294,230 | 3/1994 | Rall | 702/130 |
| 5,409,547 | 4/1995 | Watanabe et al. | 136/204 |
| 5,464,284 | 11/1995 | Rall | 702/130 |
| 5,645,349 | 7/1997 | Fraden | 374/164 |
| 5,730,528 | 3/1998 | Allison et al. | 374/161 |

*Primary Examiner*—John Barlow
*Assistant Examiner*—Bryan Bui
*Attorney, Agent, or Firm*—Gary S. Williams; Flehr Hohbach Test Albritton & Herbert LLP

[57] ABSTRACT

A method and system are disclosed for measuring a temperature of a body in a non-contact mode based on heat flux measurement. The system includes a temperature measurement apparatus to be positioned in close proximity to a body for measuring the temperature of the body. The temperature measurement apparatus comprises a thermally conducting element, a first and a second temperature sensor, and a temperature modulation arrangement. The first and second temperature sensors are mounted in the conducting element and each measures a temperature of the conducting element. The temperature modulation arrangement modulates the temperature of the conducting element until the temperatures at the first and the second temperature sensors are substantially the same. When these temperatures are equalized, heat flux into the conducting element is zero and the temperature of the conducting element represents the temperature of the body. The apparatus thus enables accurate non-contact temperature measurement of a body.

15 Claims, 2 Drawing Sheets

NON-CONTACT, ZERO-FLUX TEMPERATURE SENSOR

The present invention relates generally to a method and apparatus for a non-contact measurement of a temperature of a body, and particularly to a non-contact measurement of a temperature of a semiconductor wafer during integrated circuit fabrication.

BACKGROUND OF THE INVENTION

In semiconductor processing, there is a need to obtain precise temperature measurement of a semiconductor wafer during certain fabrication process steps. Accurate temperature measurement is an important part of fabrication process control. Since temperature measurement of the front side of the wafer is often more desirable as the front side temperature determines the process characteristics, the temperature measurement has to be performed without contacting the wafer surfaces. Contacts made to the wafer front side will contaminate the wafer and damage the fabricated devices. Furthermore, contacts made to the wafer surface cause undesirable perturbation of the local wafer temperature. Therefore, a non-contact approach to wafer temperature measurement is desired.

Radiation pyrometry is a non-contact temperature measurement technique which measures radiation emitted by a hot body at certain limited band of wavelengths. This technique is generally accurate, fast, and easily implemented. However, as fabrication process development moves toward low temperature processing, temperature measurement using pyrometry becomes unsuitable. One disadvantage of the pyrometry technique is that temperature measurement becomes increasingly noisy at lower temperatures (below 600° C.). Where a typical cold-wall chemical vapor deposition process operates in the temperature range of 450° C. to 850° C., accuracy of temperature measurement below 600° C. is imperative. Another disadvantage of pyrometry is that it is sensitive to spurious radiation and cannot differentiate between radiation emitted from the wafer and radiation reflected from or transmitted through the wafer. In wafer fabrication where the wafer is often heated on the backside, radiation transmitted through the wafer from the heat source can obscure pyrometry temperature measurement substantially. Thus, pyrometry is not a feasible temperature measurement technique during a number of wafer processing steps.

Besides semiconductor processing, other manufacturing processes also frequently require precise in situ temperature measurement of a body in a non-contact mode. Consequently, there is a need for a non-contact temperature measurement method and apparatus capable of providing accurate temperature measurement over a temperature range of at least 0° to 1,000° C.

SUMMARY OF THE INVENTION

The present invention is a non-contact temperature measurement method and apparatus that enables accurate non-contact temperature measurement at temperatures ranging from at least 0° to 1,000° C. by employing a heat flux zeroing technique.

The temperature measurement apparatus of the present invention includes a thermally conducting element to be positioned with a first end in close proximity to a body for measuring the temperature of the body. The thermally conducting element absorbs thermal energy from the body such that a heat flux is introduced into the first end of the conducting element. A temperature modulation arrangement is disposed to modulate the temperature of the conducting element. The temperature modulation arrangement adjusts the temperature of the conducting element until the conducting element is brought into thermal equilibrium with the body such that heat flux into the first end of the conducting element is reduced to zero.

Two temperature sensors are mounted at different locations in the conducting element. A first temperature sensor is mounted closer to the first end of the conducting element than a second temperature sensor. A temperature modulation control is provided to control the temperature modulation arrangement. The modulation control activates the modulation arrangement to adjust the temperature of the conducting element until both temperature sensors measure substantially the same temperature (e.g., ±0.5° C.). At that point, the conducting element is in thermal equilibrium with the body such that the net heat flux into the conducting element is zero, and the temperatures at the temperature sensors represent the temperature of the body.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
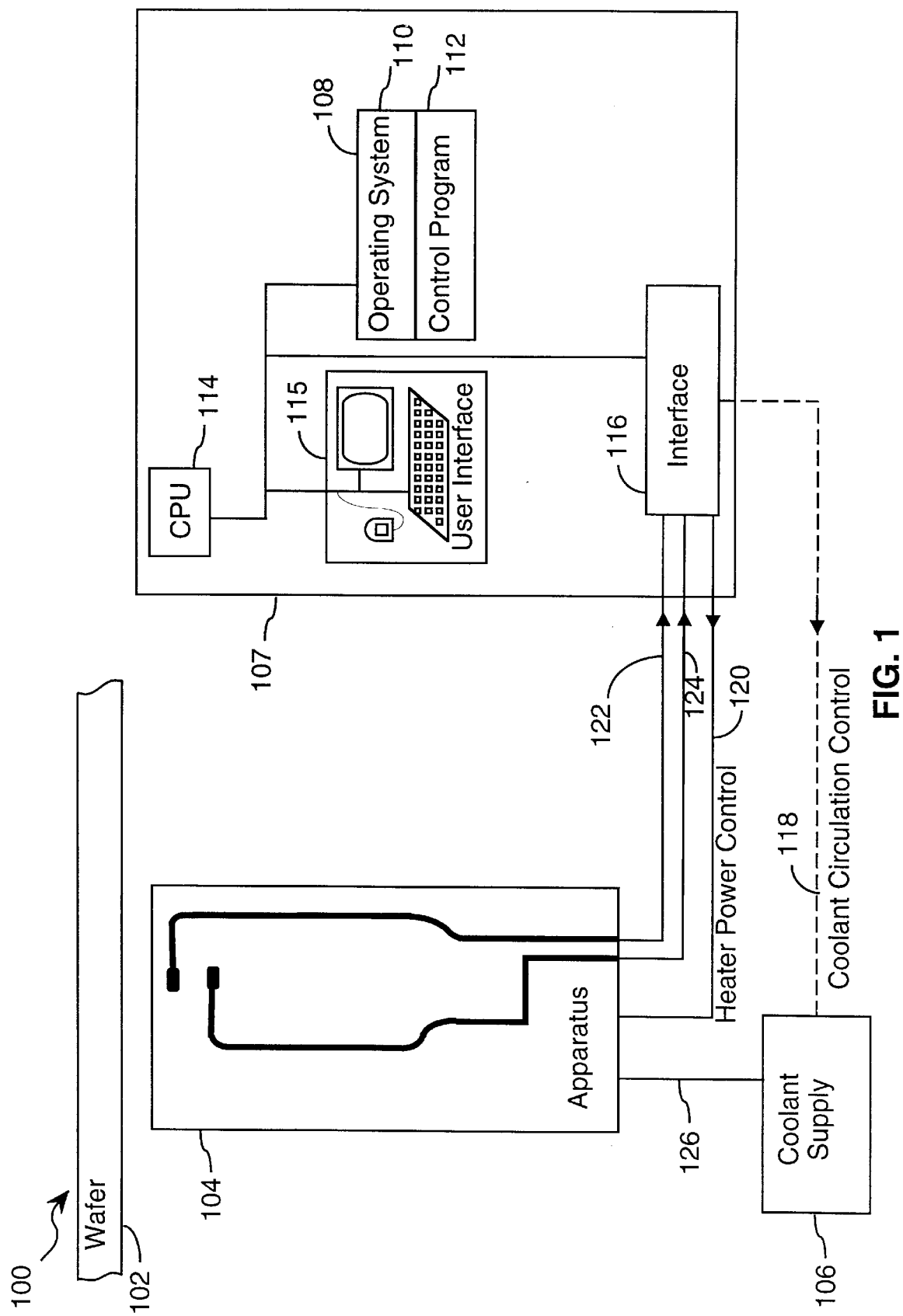
FIG. 1 is a block diagram of a preferred embodiment of a non-contact temperature measurement system based on heat flux measurement.

Referring to FIG. 1, there is shown a preferred embodiment of a system 100 for measuring a temperature of a body, such as a semiconductor wafer 102. The system 100 performs a non-contact temperature measurement based on zero heat flux. The system 100 includes a temperature measurement apparatus 104, a coolant supply 106, and a controller 107 that includes a data processor 114 and a memory 108. The memory 108 includes an operating system 110 and a control program 112. In the preferred embodiment of FIG. 1, when the measurement apparatus 104 is disposed to measure the temperature of a wafer 102, the apparatus 104 is to be positioned in close proximity to the wafer 102. The measurement apparatus 104 continuously generates a first temperature output 122 and a second temperature output 124, each output representing a temperature of the apparatus 104. The two temperature outputs 122 and 124 are fed to an interface 116 and stored in the memory 108.

The data processor 114 executes the control program 112 and computes the appropriate value for a heater power signal 120 based on the values of the first and the second temperature outputs 122 and 124. In the preferred embodiment, the flow of coolant through the measurement apparatus via coolant supply line 126 is constant. The flow of coolant through the measurement apparatus helps to maintain the temperature of the apparatus at or below the temperature of the wafer 102.

The amount of heat delivered to the measurement apparatus by a heater coil 210 (see FIG. 2) is governed by the amount of power delivered to the heater coil 210 via the heater power signal 120. The circulation of coolant and the heater power signal 120 operate in concert to modulate the temperature of the measurement apparatus 104 until heat flux measured by the measurement apparatus 104 is zero, indicating that the measurement apparatus 104 is in thermal equilibrium with the wafer 102. The zero heat flux condition is achieved when the first temperature output 122 and the second temperature output 124 are substantially equal (e.g., ±0.5° C.). When the zero heat flux condition is reached, the temperature of the wafer 102 is represented by the first and second temperature outputs 122 and 124. The operation of the temperature measurement apparatus 104 will become apparent with reference to FIG. 2.

Depending on the accuracy of temperature measurement required and the environment in which the measurement apparatus is to be used, the maximum sensor temperature measurement differential consistent with thermal equilibrium may vary depending on the temperature being measured. Typically, for lower temperature measurements, such as below 600° C., a smaller sensor measurement differential may be required than for higher temperature measurements. For example, a maximum sensor differential of ±0.5° C. might be used for temperatures above 600° C., and a maximum sensor differential of ±0.3° C. might be used for temperatures below 600° C.

In a second preferred embodiment, the flow of coolant through the measurement apparatus is variable and the data processor 114 computes a coolant circulation control signal 118 to regulate the circulation of coolant from the coolant supply 106 to the measurement apparatus 104 through coolant supply line 126. The coolant circulation control signal 118 operates to maintain the temperature of the measurement apparatus 104 at or below the temperature of the wafer 102.

Figure 2:
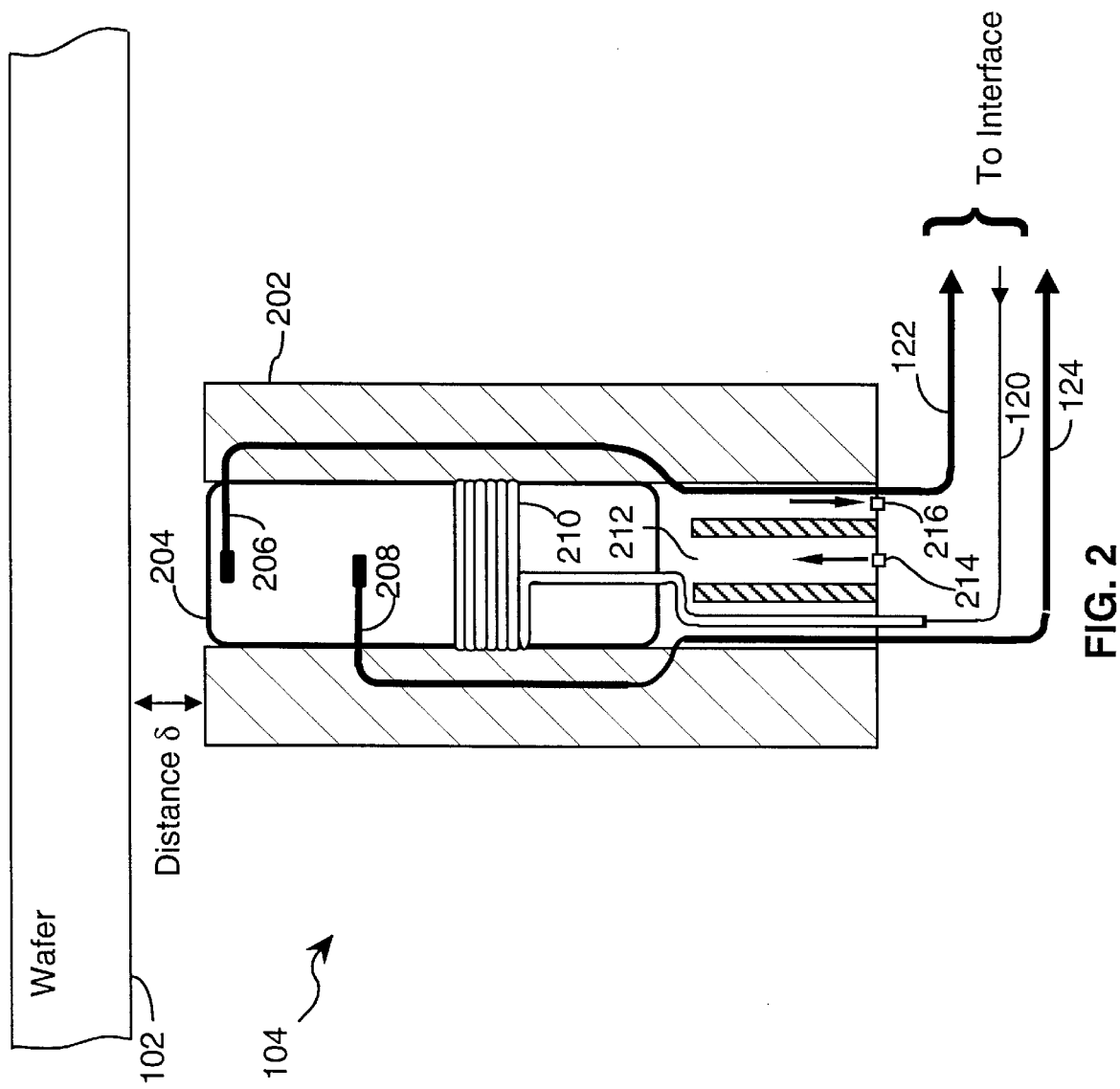
FIG. 2 shows a cross-sectional side view of the temperature measurement apparatus included within the temperature measurement system of the invention.

Referring to FIG. 2, there is shown a cross-sectional side view of the temperature measurement apparatus 104. The measurement apparatus 104 includes a thermally conducting element 204 which is cylindrically formed in this preferred embodiment. In a preferred embodiment, the thermally conducting element is formed from alumina (aluminum oxide). Depending on the application, the thermally conducting element should be formed from a material that is a good heat conductor, but one that is capable of developing a sufficient heat gradient to enable the controller to distinguish between thermal equilibrium and non-equilibrium between the temperature sensors 206, 208.

As shown in FIG. 2, the measurement apparatus 104 is to be positioned with one of its ends, a first end, a distance δ away from the wafer 102. The distance δ should be much smaller than the diameter of the conducting element 204. A first temperature sensor 206 is mounted in the conducting element 204 near the first end. A second temperature sensor 208 is mounted in the conducting element 204 away from the first end and spaced apart from the first temperature sensor 206. In the preferred embodiment, an electric heater coil 210 is mounted in the conducting element 204 to heat a zone adjacent to the second temperature sensor 208. A coolant inlet 214 and a coolant outlet 216 are connected to the coolant supply line 126 to provide circulation of a coolant 212 from the coolant supply 106 to the measurement apparatus 104. The coolant 212 is situated opposite to the first end of the conducting element 204 and operates to lower the temperature of the conducting element 204. The coolant 212 and the electric heater 210 function together to modulate the temperature of the conducting element 204. Referring again to FIG. 2, the measurement apparatus 104 also includes an insulating sheath 202 which surrounds the conducting element 204 and the coolant 212. The insulating sheath should be implemented with a material sufficient to insulate against axial heat flux so as to promote thermal stability of the measurement apparatus 104 and accuracy of temperature measurement. For instance, the insulating sheath may be a hollow tube formed from quartz or fused silica. Further, the fused silica or quartz tube may be separated from the rod-shaped conducting element by a small air gap, which provides additional heat insulation.

The operation of the temperature measurement apparatus 104 may now be appreciated with reference to FIGS. 1 and 2. After positioning the measurement apparatus 104 a distance d away from the wafer 102, the conducting element 204 absorbs thermal energy emitted from the wafer 102. The first and second temperature sensors 206 and 208 measure a first temperature and a second temperature of the conducting element 204. In a preferred implementation, the conducting element 204 should be maintained at a temperature at or just below the temperature of the wafer 102. As a result, the initial value of the first temperature will be greater than the initial value of the second temperature and a heat flux conducts through the conducting element 204. The first and second temperature readings are coupled to the first and second temperature outputs 122 and 124 which in turn are fed to the memory 108. The data processor 114 executes the control program 112 and computes the appropriate value of the heater power signal 120 based on the first and second temperature outputs 122 and 124. The heater power signal 120 then activates the electric heater coil 210 to elevate the temperature of the conducting element 204 until the first temperature is substantially equal to the second temperature (e.g., ±0.5° C.). When these two temperatures are equal, the conducting element 204 is said to be in thermal equilibrium with the wafer 102 and the heat flux from the wafer into the conducting element 204 is zero. When the heat flux is zero, the temperature of the conducting element 204 equals to the temperature of the wafer 102. The temperature of the wafer 102 is then equal to either the first temperature output 122 or the second temperature output 124 as stored in the memory 108.

In this fashion, the temperature measurement apparatus 104 is able to obtain accurate non-contact temperature measurement. One advantage of this measurement apparatus is that it operates at the temperature of the wafer 102, thus minimizing perturbations of the surface temperature of the wafer 102. Another advantage of this measurement apparatus is that it is accurate at low temperatures (e.g. 0° C. or lower) as well as at high temperatures (e.g., 1000° C. or higher).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A temperature measurement apparatus comprising:

a thermally conducting element having a first end wherein said first end is to be positioned a distance away from and not in contact with a body, said body emits thermal energy in the direction of said conducting element, and said distance is less than a dimension of said first end;

a temperature modulation apparatus that modulates the temperature of said conducting element to bring said conducting element into thermal equilibrium with said body such that heat flux into said first end is zero;

a first temperature sensor mounted in said conducting element for measuring a first temperature of said conducting element such that said first temperature represents a temperature of said body when said heat flux into said first end is zero;

a second temperature sensor mounted in said conducting element for measuring a second temperature of said conducting element, wherein said first temperature sensor is positioned closer to said first end than said second temperature sensor; and a data processor coupled to the first and second temperature sensors and to the temperature modulation apparatus, the data processor executing a control procedure for receiving temperature measurements from the first and second temperature sensors and for computing at least one control signal for regulating operation of the temperature modulation apparatus so as to equalize the temperatures at the first and second temperature sensors such that heat flux absorbed into the thermally conducting element is zero.

2. The temperature measurement apparatus of claim 1 wherein said thermally conducting element is a cylindrical rod made of alumina.

3. The temperature measurement apparatus of claim 1 wherein said first and second temperature sensors include thermocouples.

4. The temperature measurement apparatus of claim 1 further comprising:

a plurality of temperature sensors mounted in said conducting element spaced apart from each other and from said first temperature sensor;

wherein said temperature modulation means brings said conducting element in thermal equilibrium with said body by equalizing the temperatures at said first temperature sensor and said plurality of temperature sensor.

5. A temperature measurement apparatus, comprising:

a thermally conducting element having a first end wherein said first end is to be positioned a distance away from and not in contact with a body, said body emits thermal energy in the direction of said conducting element, and said distance is less than a dimension of said first end;

a temperature modulation apparatus that modulates the temperature of said conducting element to bring said conducting element into thermal equilibrium with said body such that heat flux into said first end is zero;

a first temperature sensor mounted in said conducting element for measuring a first temperature of said conducting element such that said first temperature represents a temperature of said body when said heat flux into said first end is zero;

a second temperature sensor mounted in said conducting element for measuring a second temperature of said conducting element, wherein said first temperature sensor is positioned closer to said first end than said second temperature sensor;

a data processor coupled to the first and second temperature sensors and to the temperature modulation apparatus, the data processor executing a control procedure for receiving temperature measurements from the first and second temperature sensors and for computing at least one control signal for regulating operation of the temperature modulation apparatus so as to equalize the temperatures at the first and second temperature sensors such that heat flux absorbed into the thermally conducting element is zero;

an electric heater mounted in said conducting element for heating a zone adjacent to said second temperature sensor;

a coolant inlet and a coolant outlet for circulating coolant in said apparatus; and a coolant supply coupled to said coolant inlet and outlet for introducing coolant into said apparatus to maintain the temperature of said apparatus at or below the temperature of said body.

6. The temperature measurement apparatus of claim 5 further comprising:

a thermally insulating sheath surrounding substantially all of said apparatus except said first end to thermally stabilize said apparatus.

7. A non-contact temperature measurement system comprising:

a temperature measurement apparatus for measuring the temperature of a body, said apparatus having a thermally conducting element and a first temperature sensor;

said thermally conducting element having a first end to be positioned a distance away from said body, said distance is smaller than a dimension of said first end;

said first temperature sensor mounted in said conducting element measures a first temperature of said conducting element such that said first temperature represents the temperature of said body when heat flux absorbed into said first end is zero;

a temperature modulating means for modulating the temperature of said conducting element to bring said conducting element into thermal equilibrium with said body such that said heat flux absorbed into said first end is zero;

a data processor that generates a temperature modulation control signal for regulating said temperature modulating means; and memory for storing a control program for execution by said data processor including instructions to receive said first temperature from said first temperature sensor and to regulate said temperature modulation means, said memory further storing data representing said first temperature.

8. A non-contact temperature measurement system of claim 7, wherein:

said temperature measurement apparatus further comprises a second temperature sensor mounted in said conducting element for measuring a second temperature of said conducting element, wherein said first temperature sensor is positioned in closer proximity to said first end than said second temperature sensor;

said memory further storing the value of said second temperature;

said data processor generates said temperature modulation control signal based on said first and second temperatures; and said temperature modulation control signal regulates said temperature modulation means so as to equalize said first and second temperatures such that said heat flux into said first end is zero.

9. A non-contact temperature measurement system of claim 8, wherein said temperature modulating means comprises:

an electric heater controlled by a heater power control signal for elevating the temperature of said conducting element;

a coolant supply controlled by a coolant circulation control signal for providing circulation of coolant to said apparatus; and said data processor generating said heater power and coolant circulation control signals so as to equalize said first and second temperatures such that said heat flux into said first end is zero.

10. A non-contact temperature measurement system of claim 9, wherein said temperature measurement apparatus is substantially surrounded by an insulating sheath except at said first end to thermally stabilize said apparatus.

11. A computer program product, for use in conjunction with a temperature measurement system, comprising a computer readable storage medium and a computer program mechanism embedded therein, the computer readable storage medium comprising:

a control procedure including instructions for controlling a temperature measurement apparatus and a temperature modulation means, wherein said apparatus is used to measure the temperature of a body and is comprised of a thermally conducting element and a plurality of temperature sensors mounted in said conducting element;

wherein said control procedure includes instructions to store data representing temperature measurements made by said plurality of temperature sensors and instructions to compute at least one control signal for regulating operation of said temperature modulating means so as to equalize the temperatures at said plurality of temperature sensors such that heat flux absorbed into said conducting element is zero.

12. The computer program product of claim 11, said temperature modulation means comprising an electric heater and a coolant supply;

said control procedure including instructions to generate a first control signal to regulate said heater by adjusting the heater power to equalize the temperatures at said plurality of temperature sensors; and said control procedure further including instructions to generate a second control signal to regulate said coolant supply by controlling the circulation of coolant to said apparatus for maintaining the temperature of said apparatus at or below the temperature of said body.

13. A method of measuring the temperature of a body comprising the steps of:

positioning a temperature measurement apparatus in close proximity to but not in contact with the body, the temperature measurement apparatus having a thermally conducting element and a plurality of temperature sensors mounted in the conducting element;

obtaining a plurality of temperature measurements from the plurality of temperature sensors;

providing an electric heater and a coolant supply to modulate the temperature of the conducting element;

adjusting the heater to elevate the temperature of the conducting element until the plurality of temperature measurements are substantially equal, indicating that heat flux into the conducting element is zero and the plurality of temperature measurements represent the temperature of the body; and controlling circulation of coolant to the temperature measurement apparatus to maintain the temperature of the temperature measurement apparatus at or below the temperature of the body.

14. A method of measuring the temperature of a body comprising the steps of:

positioning a temperature measurement apparatus in close proximity to but not in contact with the body, the temperature measurement apparatus having a thermally conducting element, and first and second temperature sensors mounted in the conducting element, the thermally conducing element having a first end positioned in close proximity to but not in contact with the body, such that the first temperature sensor is positioned closer to the first end than the second temperature sensor;

providing temperature modulation apparatus that modulates the temperature of the conducting element; and using a programmed data processor, receiving temperature measurements from the first and second temperature sensors and generating at least one control signal for regulating operation of the temperature modulation apparatus so as to equalize the temperatures at the first and second temperature sensors and to bring the conducting element into thermal equilibrium with the body such that heat flux into the first end is zero, the temperature measurements from either the first or second temperature sensors representing the temperature of the body.

15. A method of measuring the temperature of a body comprising the steps of:

positioning a temperature measurement apparatus in close proximity to but not in contact with the body, the temperature measurement apparatus having a thermally conducting element, and first and second temperature sensors mounted in the conducting element, the thermally conducing element having a first end positioned in close proximity to but not in contact with the body, such that the first temperature sensor is positioned closer to the first end than the second temperature sensor;

providing temperature modulation apparatus that modulates the temperature of the conducting element; and using a programmed data processor, receiving temperature measurements from the first and second temperature sensors and generating at least one control signal for regulating operation of the temperature modulation apparatus so as to equalize the temperatures at the first and second temperature sensors and to bring the conducting element into thermal equilibrium with the body such that heat flux into the first end is zero, the temperature measurements from either the first or second temperature sensors representing the temperature of the body;

the temperature modulation apparatus comprising an electric heater and a coolant supply;

the step of generating at least one control signal performed by the programmed data processing including:

generating a first control signal to regulate the heater by adjusting the heater power to equalize the temperatures at the first and second temperature sensors; and generating a second control signal to regulate the coolant supply by controlling the circulation of coolant to the temperature measurement apparatus for maintaining the temperature of the temperature measurement apparatus at or below the temperature of the body.

* * * * *